No. 653,941. Patented July 17, 1900.
J. F. SKIRROW.
TELEGRAPH SWITCHING APPARATUS.
(Application filed Jan. 5, 1900.)
(No Model.) 4 Sheets—Sheet 1.

No. 653,941. Patented July 17, 1900.
J. F. SKIRROW.
TELEGRAPH SWITCHING APPARATUS.
(Application filed Jan. 5, 1900.)
(No Model.) 4 Sheets—Sheet 2.

WITNESSES:
Norris H. Clark.
A. M. Donleoy.

INVENTOR
John F. Skirrow
BY
ATTORNEY

No. 653,941. Patented July 17, 1900.
J. F. SKIRROW.
TELEGRAPH SWITCHING APPARATUS.
(Application filed Jan. 5, 1900.)
(No Model.) 4 Sheets—Sheet 3.
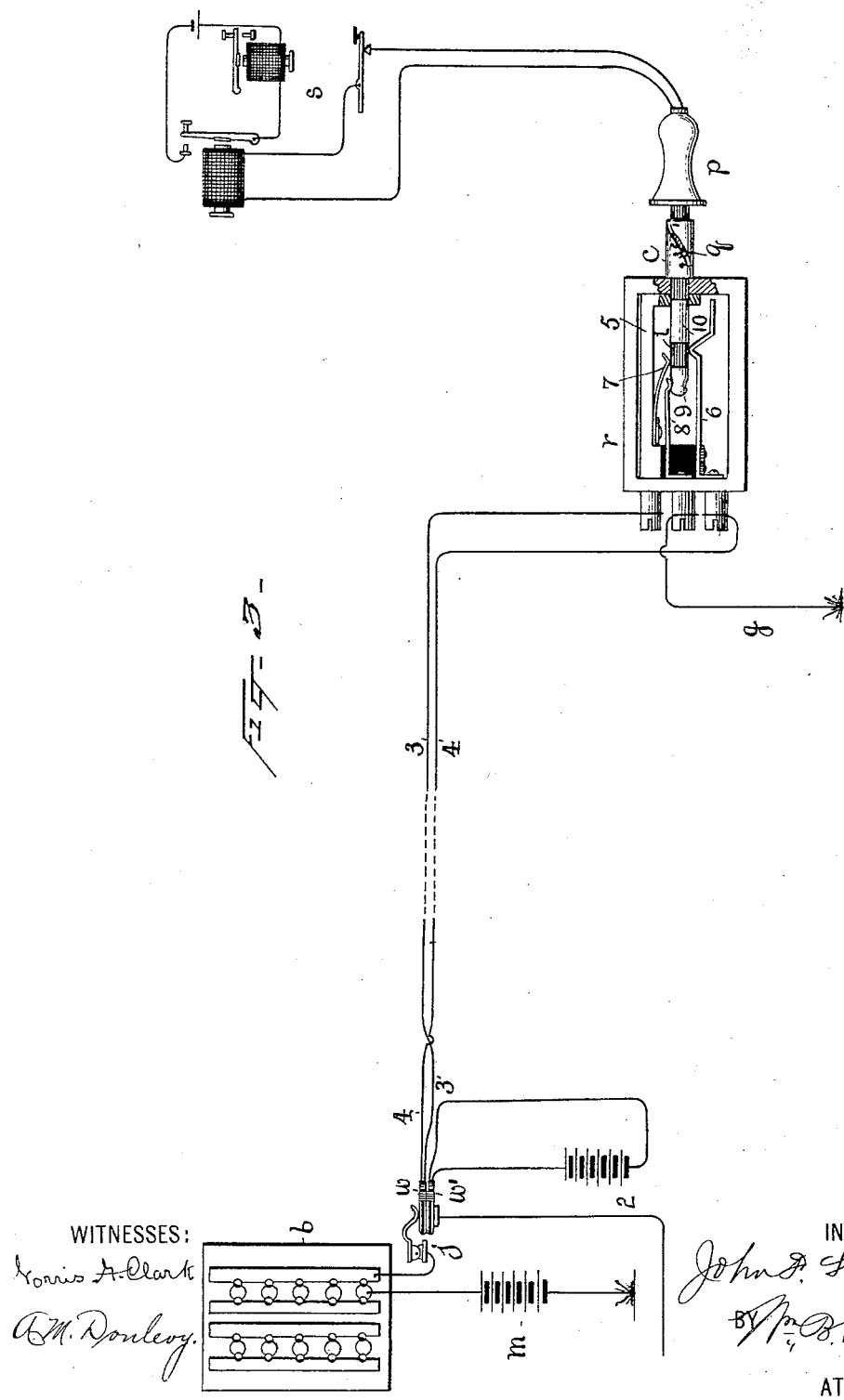
WITNESSES:
INVENTOR
ATTORNEY No. 653,941. Patented July 17, 1900.
J. F. SKIRROW.
TELEGRAPH SWITCHING APPARATUS.
(Application filed Jan. 5, 1900.)
(No Model.) 4 Sheets—Sheet 4.
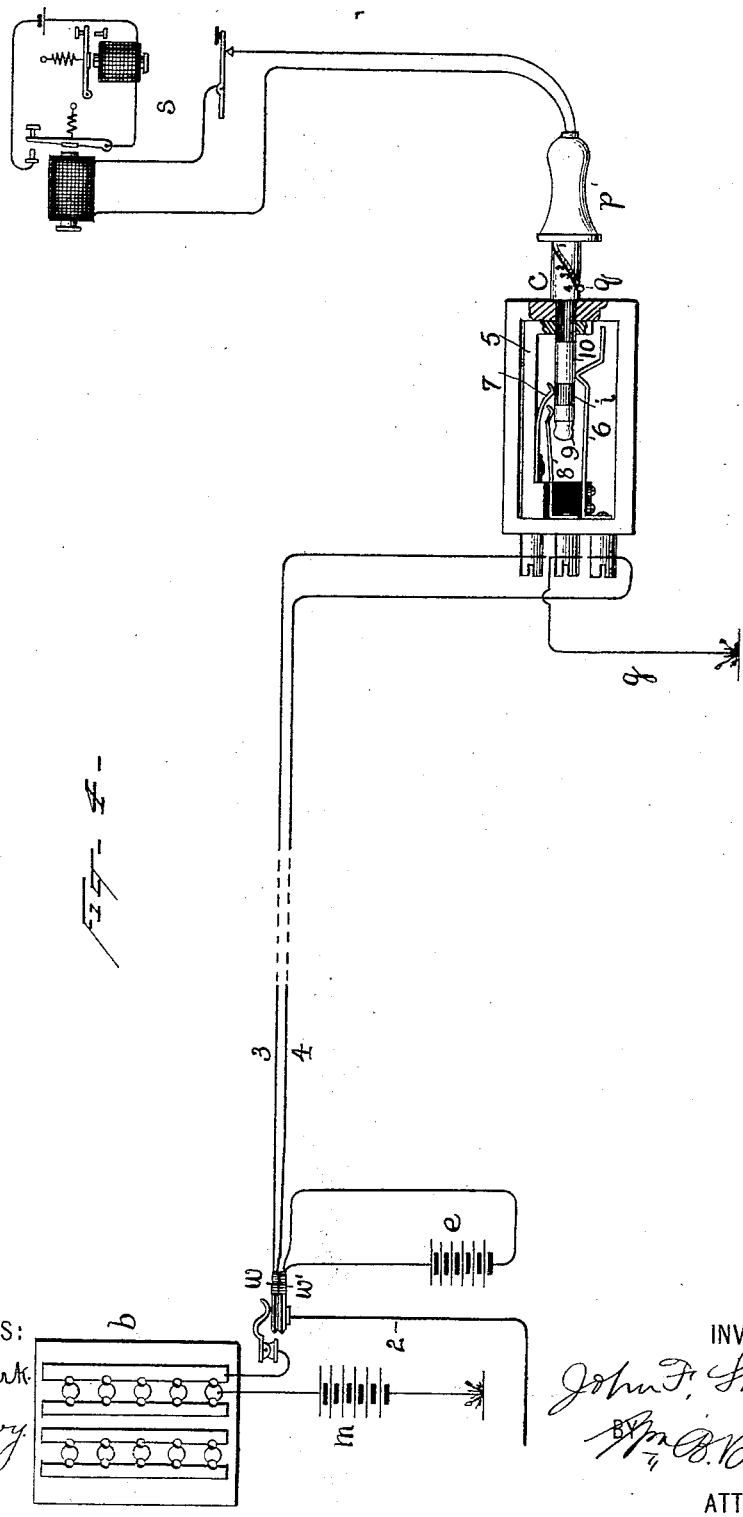
WITNESSES: 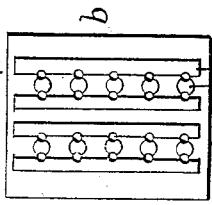 INVENTOR
John F. Skirrow
ATTORNEY

UNITED STATES PATENT OFFICE.

JOHN F. SKIRROW, OF EAST ORANGE, NEW JERSEY.

TELEGRAPH SWITCHING APPARATUS.

SPECIFICATION forming part of Letters Patent No. 653,941, dated July 17, 1900.

Application filed January 5, 1900. Serial No. 424. (No model.)

*To all whom it may concern:*

Be it known that I, JOHN F. SKIRROW, a citizen of the United States, residing at East Orange, in the county of Essex, State of New Jersey, have made certain new and useful Improvements in Telegraph Switching Apparatus, of which the following is a specification.

My invention relates to the connection of a branch telegraph-office located on a loop with a main telegraph-wire at a main station or office.

The object of my invention is to provide means for throwing out either side of a damaged loop and working a ground-return circuit in place thereof and to make such change in connection mechanically or without the employment of any but the most ordinary skill at the substation.

I provide a jack-plug having two contact-points on its spindle, which form the terminals of the Morse instruments, and a spring-jack having a series of contact-points registering with the plug-contacts. There are four points arranged to be connected in pairs. When the plug is inserted a fixed distance—the first position—connection is made with one pair of contacts and the instrument is included in the loop. Upon the occurrence of a line trouble or disturbance the plug is inserted to a further extent—the second position—the loop is opened, and the main battery is short-circuited, causing a normally-irresponsive indicating instrument at the main station to attract attention. Upon a further insertion of the plug—the third position—connection is made with one side of the loop only, circuit passing through the substation instrument to the ground, and upon a further insertion—the fourth position—the same connection is made with the other side of the loop—this is assuming that the first side of the loop is in trouble—the main-station operator at the proper time making necessary changes in connections.

The accompanying drawings illustrate my invention.

Figure 1:
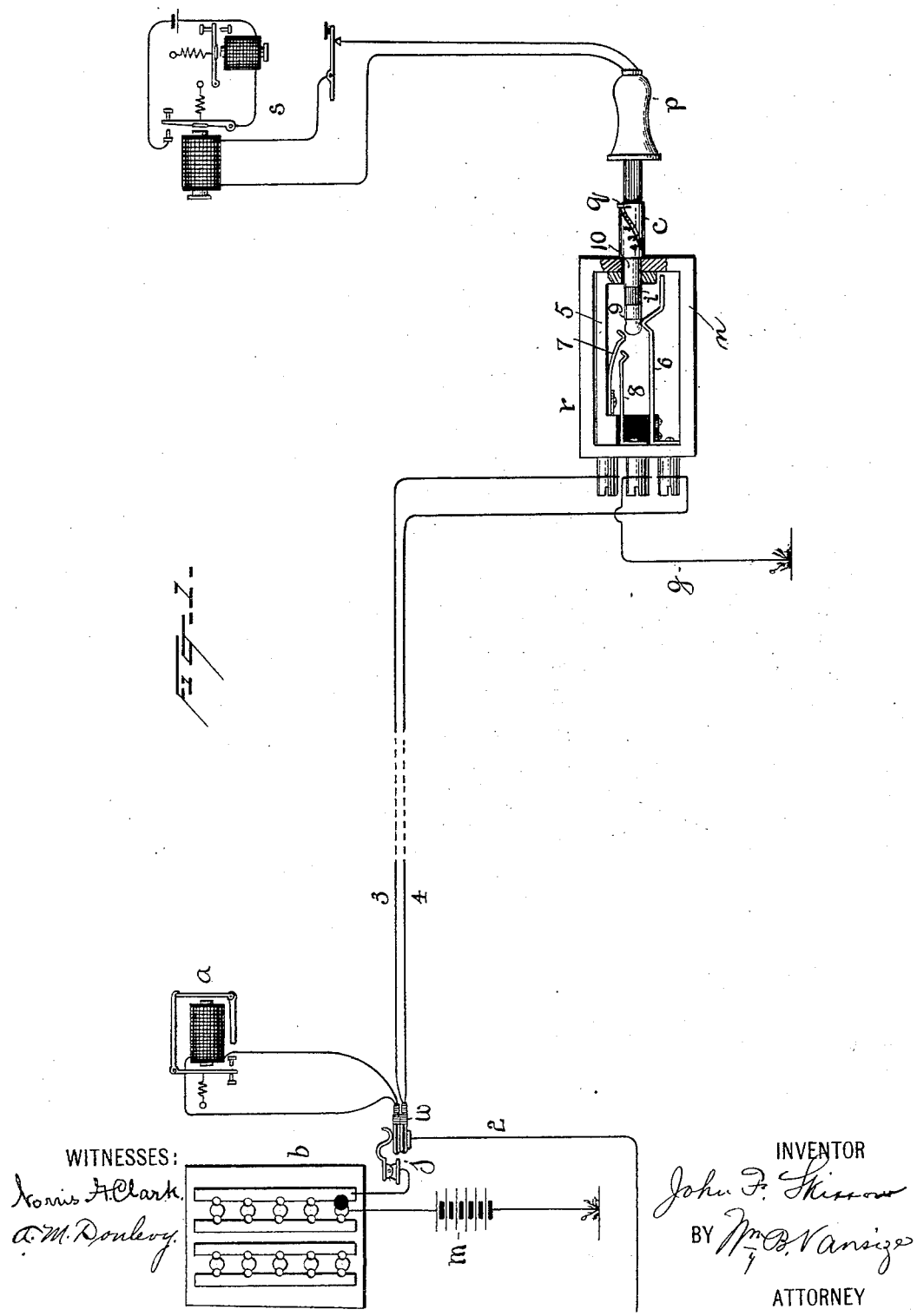
Figure 2:
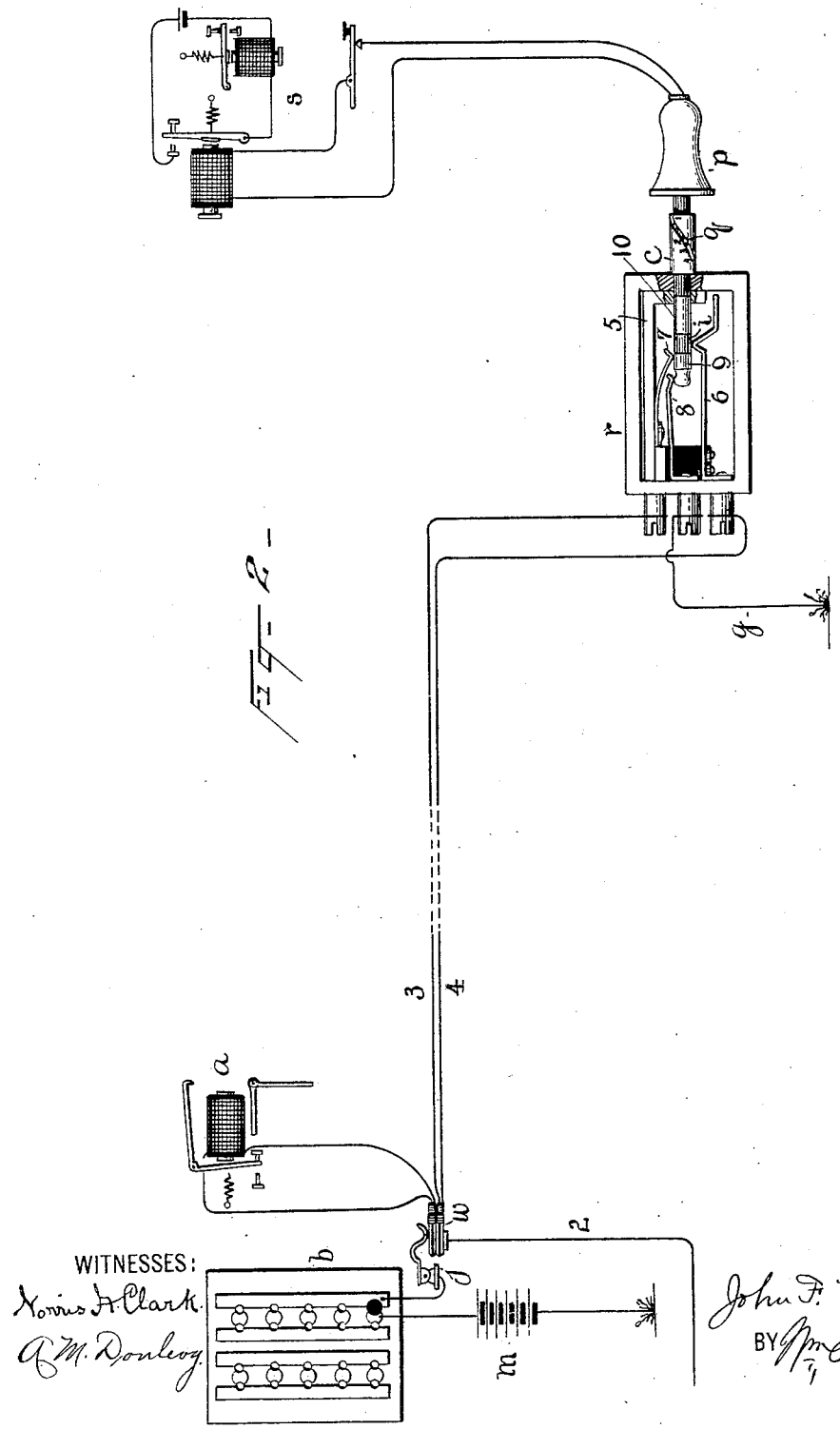

Figure 1 shows the main-station switchboard and annunciator with the loop to the substation-switch and instrument all in normal position. Fig. 2 shows the same elements. The switch-plug at the substation being in its second position opens the loop and grounds the main battery through the annunciator at the main station. Fig. 3 shows the same elements. The switch-plug at the substation in its third position grounds one side of the loop, the main battery at the main station is thrown out, and an intermediate battery inserted. Fig. 4 shows the same elements with the switch-plug at the substation in its fourth position, the main battery at the main station thrown out, an intermediate battery introduced, and the second side of the loop grounded through the substation instrument, the arrangement being similar to Fig. 3, but substituting the second side of the loop for the first side.

In Fig. 1, $b$ is the switchboard of the main station; $j$, the spring-jack; $m$, the main battery. 2 is the main-line wire. A loop 3 4 on a wedge $w$ is in the spring-jack $j$. There is also an annunciator $a$, adjusted so as not to respond to the normal strength of current; but in the event of an increased strength of current, as by short-circuiting the main battery at the substation, the annunciator $a$ is dropped. The instruments $s$ at the substation are connected to a spring-jack plug having two contacts 9 and 10. There is a spring-jack having four contacts so located in respect to each other and to the contacts 9 and 10 of the plug $p$ that they may be connected in four different pairs. The spring-jack is in a box of insulating material $n$ and has a contact 5, formed of an L-shaped piece of rigid metal with a perforation in the shorter arm, through which the plug $p$ passes. Fixed to this contact 5 and electrically connected with it is a spring-contact 7. The contacts 5 and 7 are connected to one side 3 of the loop. 6 is a spring-contact connected with the side 4 of the loop. 8 is a spring-contact connected to the ground-wire $g$. The switch-plug $p$ has a pin $q$ projecting from its surface, and this travels in the helical groove or passage in the metal cylinder $c$, surrounding the plug-hole and fixed to the case $n$. The plug $p$ is capable of taking four separate positions and making four different connections. These positions are marked on the line of the helical passage in cylinder $c$, and when the pin $q$ on plug $p$ registers with either of these numerals 1 2 3 4 the connection corresponding to the numeral is secured.

In Fig. 1 the instruments and conductors are in their normal position, circuit passing through the main conductor 2, by wedge w 4 6 9 s 10 5 3, annunciator a, through the board b, battery m, to earth. In Fig. 2 it is assumed that an interruption has occurred. The substation-operator passes the plug p to the second position, the pin q registering with the scale-mark 2. The spring-contact 6 rests upon an insulated section of the plug i. The loop-line 4 is open, and circuit is made from the grounded main battery m through the switchboard, annunciator a, loop-conductor 3, spring-contact 7, plug-contact 9, spring-contact 8, ground-wire g. The increased strength of current drops the annunciator a. The main-station operator cuts in and coöperates with the substation. The substation-operator without further delay passes the plug p to the third position, as shown in Fig. 3, the pin q and scale-mark 3 registering. Circuit now passes from main line 2, through intermediate battery e on the wedge w', conductor 3 of the loop, to the contact 5, plug-contact 10, instrument s to plug-contact 9, spring-contact 8, and ground-wire g, the main station appearing as a way-station with an intermediate battery. This is assuming that the conductor 4 of the loop is in trouble. Assuming that conductor 3 of the loop is in trouble, the substation-operator pushes plug p to its fourth position, pin q and mark 4 of the scale registering. Circuit passes from main line 2, battery-wedge w', through the battery e to conductor 4 of the loop, spring-contact 6, plug-contact 10, instrument s to plug-contact 9, ground-contact 8, ground-wire g. Line trouble, such as a ground or escape, may thus be rendered ineffective to interrupt the use of the loop. A break on the loop on side 4 would be reported by the substation operator applying the ground connection, and thus dropping the annunciator a. The main station would then turn wedge w over and insert battery e, as shown in Fig. 3. If a break occurred on side 3 of the loop, the substation would apply the ground-contact and continue to signal to the distant station, working on the distant-station battery-section alone or the main station would notice the cessation in operation due to the break and insert the intermediate battery e, as shown in Fig. 4.

Instead of employing the intermediate battery e at the main station the main battery m might be retained in use and an automatic repeater introduced between the undamaged conductor 3 or 4 of the loop and the main line 2. It is to be noticed that by this arrangement a class of operators having sufficient skill to transmit and receive by means of the Morse alphabet may be employed at substations, such as brokers' offices, and may make the necessary changes to secure the benefits of employing either side of the loop alone without skill or instruction in the manipulation of wires and circuits.

What I claim, and desire to secure by Letters Patent, is—

1. A main telegraph-line, a main station, a loop connected in said line at the main station extending to a substation, a multiple-contact spring-jack at the substation having its first and second contact-points connected to the two sides of the loop, respectively, and its third and fourth points connected to one side of said loop and the ground, respectively; in combination with a jack-plug having two contacts forming the respective terminals of suitable telegraphic apparatus, said plug being capable of taking three separate contact positions; first, registering with the first and second jack-contacts, connecting the instrument into the loop; second, registering with the first and fourth jack-contacts, connecting the instrument into the first grounded side of the loop; and third, registering with the second and fourth jack-contacts, connecting the instrument into the second grounded side of the loop.

2. The combination of a main telegraph-circuit, a main station, a loop in said line at the main station extending to a substation, an electromagnet at the main station irresponsive to normal current impulses, connected in the main line between said loop and main battery, a jack-plug having a pair of contacts forming terminals of suitable telegraphic apparatus at the substation, a spring-jack therefor having a pair of separable contact-points forming, respectively, the terminals of the loop, and a pair of separated contacts connected to one side of said loop and a ground-return, respectively, said separated contacts being located in close proximity whereby a plug-contact in passing from one registering pair of jack-contacts to the other connects the ground-contact and loop-contact together to short-circuit and operate the magnet at the main station.

JOHN F. SKIRROW.

Witnesses:
THEODORE L. CUYLER, Jr.,
ANNA M. DONLEVY.